(12) United States Patent
Jang et al.

(10) Patent No.: US 8,707,544 B2
(45) Date of Patent: Apr. 29, 2014

(54) METHOD OF MANUFACTURING IN-PLANE SWITCHING MODE LIQUID CRYSTAL DISPLAY

(75) Inventors: Jeongwoo Jang, Paji-si (KR); Hanwook Hwang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 210 days.

(21) Appl. No.: 13/339,178

(22) Filed: Dec. 28, 2011

(65) Prior Publication Data

US 2012/0266450 A1    Oct. 25, 2012

(30) Foreign Application Priority Data

Apr. 20, 2011    (KR) .................. 10-2011-0036664

(51) Int. Cl.
    *H01S 4/00*    (2006.01)
(52) U.S. Cl.
    USPC .............. 29/592.1; 29/831; 29/835; 29/846; 29/854; 345/55; 345/87; 345/82; 345/204; 349/58; 349/59; 349/96; 349/122; 349/149

(58) Field of Classification Search
    USPC ............. 29/592.1, 602.1, 831, 835, 846, 854, 29/871, 872, 873; 313/110, 495, 504, 506; 345/55, 87, 92, 204; 349/33, 58, 59, 349/96, 122, 149
    See application file for complete search history.

(56) References Cited

U.S. PATENT DOCUMENTS

| | | | |
|---|---|---|---|
| 7,468,775 B2 * | 12/2008 | Lee et al. | 349/153 |
| 7,692,756 B2 * | 4/2010 | Kim | 349/156 |
| 8,242,998 B2 * | 8/2012 | Gui | 345/92 |

* cited by examiner

*Primary Examiner* — Paul D Kim
(74) *Attorney, Agent, or Firm* — Birch, Stewart, Kolasch & Birch, LLP

(57) ABSTRACT

Provided is a method for manufacturing an in-plane switching mode liquid crystal display, which can prevent the problem of bubble generation caused by an Ag dot during the attachment process of a liquid crystal panel and a cover substrate, and improve the yield of an Ag dot process. A method for manufacturing an in-plane switching mode liquid crystal display according to an embodiment of the present invention may comprise: forming a liquid crystal panel by interposing a liquid crystal layer between a color filter substrate and a TFT array substrate; attaching a polarizer, with a protective film attached thereon, on the color filter substrate; forming an Ag dot to be in contact with an edge of the protective film, the color filter substrate, and the TFT array substrate; removing part of the Ag dot by removing the protective film; and attaching a cover substrate on the color filter substrate.

10 Claims, 12 Drawing Sheets

METHOD OF MANUFACTURING IN-PLANE SWITCHING MODE LIQUID CRYSTAL DISPLAY

This application claims the benefit of Korean Patent Application No. 10-2011-0036664 filed on Apr. 20, 2011, which is hereby incorporated by reference.

BACKGROUND

1. Field

This document relates to a method for manufacturing an in-plane switching mode liquid crystal display, and more particularly to, a method for manufacturing an in-plane switching mode liquid crystal display, which can prevent the problem of bubble generation caused by an Ag dot during the attachment process of a liquid crystal panel and a cover substrate, and improve the yield of an Ag dot process.

2. Related Art

Recently, with the development of various portable electronic devices, such as mobile phones, PDAs, notebook computers, etc., a light, thin, small flat panel display device has been in great demand. Research and development are actively conducted for the flat panel display devices, such as an LCD, a PDP (Plasma Display Panel), an FED (Field Emission Display), etc. Among these devices, the LCD attracts much more attention because of its simple mass-production technique, easy driving system, and implementation of a high picture quality.

There are various display modes, such as TN and VA, for the LCD device according to arrangement of liquid crystal molecules. Currently, a TN (twisted pneumatic) mode LCD device is being generally utilized because of short response time and low driving voltage. When a voltage is applied to the TN mode LCD device, liquid crystal molecules aligned to be horizontal to a substrate are aligned to be nearly perpendicular to a surface of the substrate. Accordingly, there is a problem in that a viewing angle is narrowed by refractive anisotropy of the liquid crystal molecules in applying of the voltage.

In order to solve this problem, LCD devices of in-plane switching modes having wide viewing angle characteristics have been proposed.

FIG. 1a is a view showing a structure of a conventional in-plane switching mode liquid crystal display. FIG. 1b is a view showing a conventional method for manufacturing an in-plane switching mode liquid crystal display.

Referring to FIG. 1a, the in-plane switching mode liquid crystal display 1 comprises a liquid crystal panel LP comprising a TFT array substrate 3 having thin film transistors, a common electrode, pixel electrodes, and a driving IC 4, a color filter substrate 5 having rear ITO and color filters, and a liquid crystal layer (not shown) interposed between the substrates. A lower polarizer 7 is disposed under the TFT array substrate 3, and an upper polarizer 8 is disposed on top of the color filter substrate 5.

An Ag dot 10 connecting the rear ITO of the color filter substrate 5 and the ground of the TFT array substrate 3 is disposed on the bonded edge of the TFT array substrate 3 and the color filter substrate 5. And, a cover substrate 12 is attached and disposed on the liquid crystal panel LP through an OCA (Optical Clear Adhesive) film 13.

A process for forming the Ag dot is performed by a manual or automatic process. In particular, in the manual process, the size of the Ag dot 10 may be increased depending on a manufacturer. Also, in the automatic process, the cohesiveness of Ag paste is made low in order to prevent a nozzle for applying the Ag dot from being blocked. Due to this, the size of the Ag dot may be increased after the application of the Ag paste.

Accordingly, as shown in FIG. 1b, the Ag dot 10 intrudes into the area to which the cover substrate 12 is bonded, thus causing the problem that bubbles are produced between the OCA film 13 and the upper polarizer 8. Therefore, the yield of the bonding process of the cover substrate and the liquid crystal panel and the Ag dot process is low.

SUMMARY

An aspect of this document is to provide a method for manufacturing an in-plane switching mode liquid crystal display, which can prevent the problem of bubble generation caused by an Ag dot during the attachment process of a liquid crystal panel and a cover substrate, and improve the yield of an Ag dot process.

A method for manufacturing an in-plane switching mode liquid crystal display according to an aspect of the present invention may comprise: forming a liquid crystal panel by interposing a liquid crystal layer between a color filter substrate and a TFT array substrate; attaching a polarizer, with a protective film attached thereon, on the color filter substrate; forming an Ag dot to be in contact with an edge of the protective film, the color filter substrate, and the TFT array substrate; removing part of the Ag dot by removing the protective film; and attaching a cover substrate on the color filter substrate.

A method for manufacturing an in-plane switching mode liquid crystal display according to another aspect of the present invention may comprise: forming a liquid crystal panel by interposing a liquid crystal layer between a color filter substrate and a TFT array substrate; attaching a polarizer, with a protective film attached thereon, on the color filter substrate, the protective film having an open portion; forming an Ag dot to be in contact with an edge of the protective film, the polarizer, the color filter substrate, and the TFT array substrate; removing part of the Ag dot by removing the protective film; and attaching a cover substrate on the color filter substrate.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

DETAILED DESCRIPTION

Reference will now be made in detail embodiments of the invention examples of which are illustrated in the accompanying drawings.

Figure 1A:
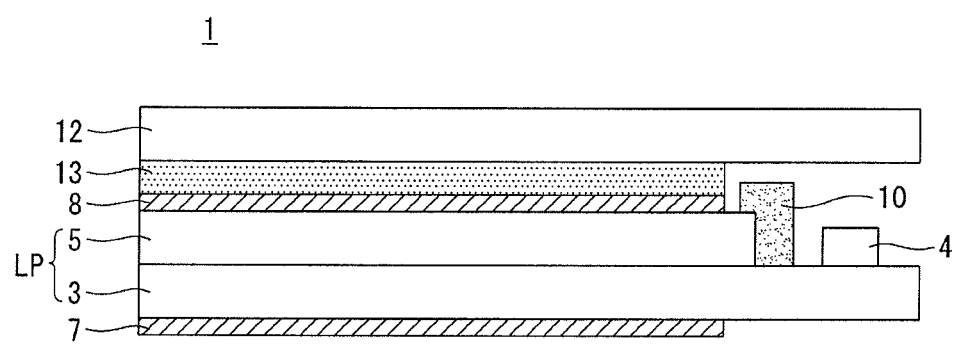
FIG. 1a is a view showing a structure of a conventional in-plane switching mode liquid crystal display.
Figure 1B:
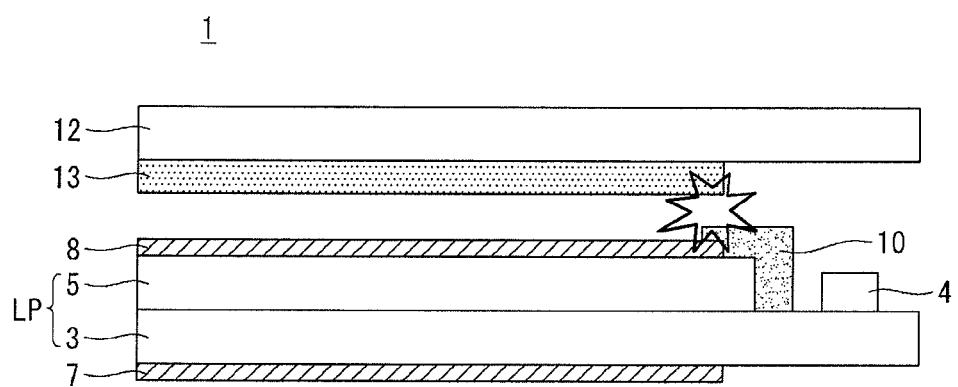
FIG. 1b is a view showing a conventional method for manufacturing an in-plane switching mode liquid crystal display.
Figure 2:
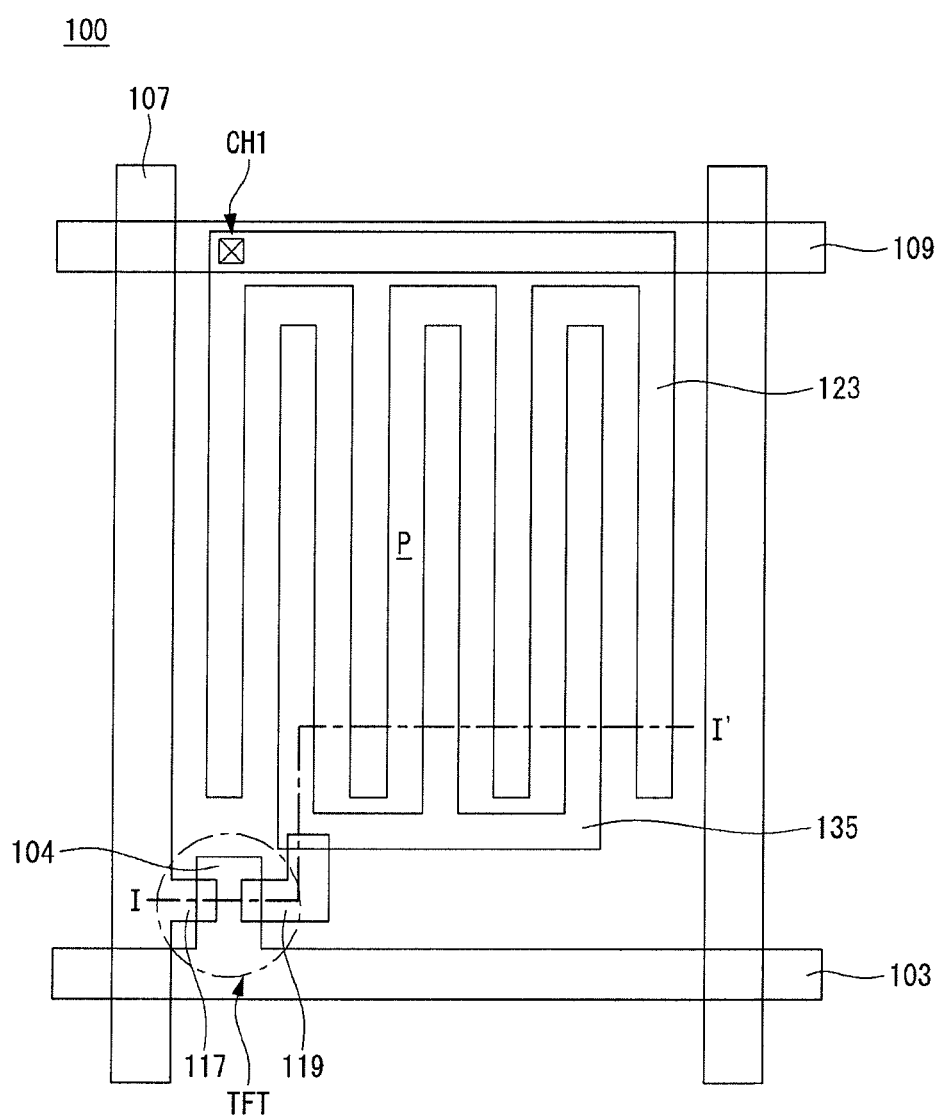
FIG. 2 is a plane view showing an in-plane switching mode liquid crystal display according to the present invention.
Figure 3:
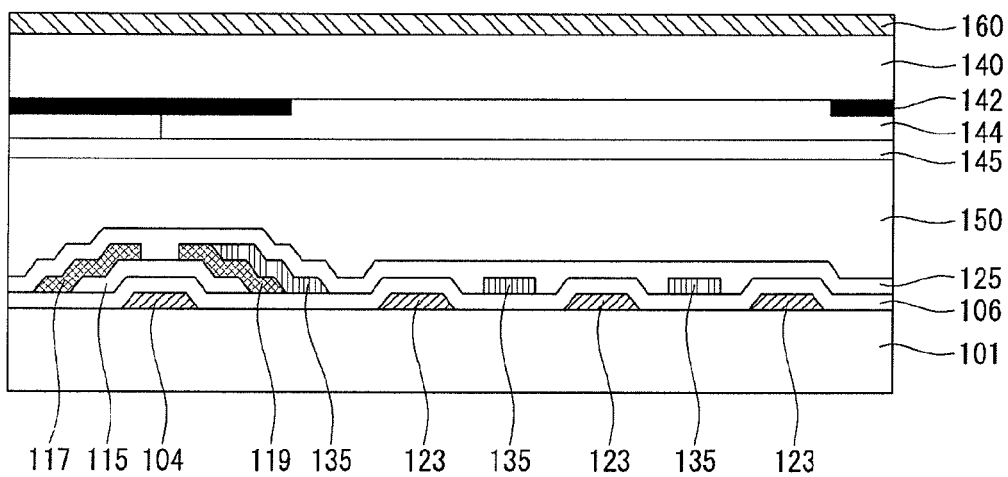
FIG. 3 is a cross-sectional view taken along line I-I' of FIG. 2.

FIG. 2 is a plane view showing an in-plane switching mode liquid crystal display according to the present invention. FIG. 3 is a cross-sectional view taken along line I-I' of FIG. 2. In the following, the in-plane switching mode liquid crystal display will be described by taking one subpixel as an example.

Referring to FIG. 2, a gate line 103 extended and arranged in one direction is disposed on a substrate (not shown), and a data line 107 crossing the gate line 103 and defining a subpixel P is disposed thereon. Also, a common line 109 crossing the data line 107 and arranged in parallel to the gate line 103 is disposed thereon. The subpixel P is defined by the crossings of the gate line 103, the data line 107, and the common line 109.

In the subpixel P, a thin film transistor TFT is disposed, which comprises a gate electrode 104 extending from the gate line 103, a gate insulation film (not shown), a semiconductor layer (not shown), a source electrode 117 electrically connected to the data line 107, and a drain electrode 119 separated from the source electrode 117.

In this drawing, the thin film transistor TFT is illustrated such that the channel forming area has an I-shape, but not limited thereto and may have a U-shape. Also, the thin film transistor TFT is illustrated as protruding from the gate line 103 to the subpixel P, but not limited thereto and the gate electrode 103 may be the gate line 103 itself.

Inside the subpixel P, a branched electrode 123 is connected to the common line 109 and a contact hole CH1. Also, a pixel electrode 135 alternating with the common electrode 123 is disposed corresponding to the branched common electrode 123. Here, the pixel electrode 135 is connected to the drain electrode 119 of the thin film transistor TFT.

Hereinafter, a cross-sectional structure of the aforementioned in-plane switching mode liquid crystal display of the present invention depending on a plane structure thereof will be described.

Referring to FIG. 3, in the in-plane switching mode liquid crystal display of the present invention, the gate electrode 104 extending from the gate line (not shown) arranged in one direction is disposed on the TFT array substrate 101, and the common electrode 123 is disposed on the same plane.

A gate insulation film 106 for insulating the gate electrode 104 and the common electrode 123 is disposed on the gate electrode 104 and the common electrode 123, and a semiconductor layer 115 corresponding to the gate electrode 103 is disposed on the gate insulation film 106. The source electrode 117 and the drain electrode 119 are respectively disposed on both side ends of the semiconductor layer 115, thereby configuring a thin film transistor TFT comprising the gate electrode 103, the semiconductor layer 115, the source electrode 117, and the drain electrode 119.

The pixel electrode 135 disposed to be alternate with the common electrode 123 is disposed on the gate insulation film 106. A passivation film 125 covering the source electrode 117, the drain electrode 119, and the pixel electrode 135 is disposed, thereby configuring the TFT array substrate 101.

A color filter substrate 140 facing the TFT array substrate 101 is disposed. R, G, and B color filters 144 are disposed on the bottom face of the color filter substrate 140, and a black matrix 142 is disposed between the color filters 144. An overcoat layer 145 is disposed on the color filters 144, and rear ITO 160 for preventing static electricity is disposed on top of the color filter substrate 140, thereby configuring the color filter substrate 140.

A liquid crystal layer 150 is interposed between the TFT array substrate 101 and the color filter substrate 140, thereby configuring the in-plane switching mode liquid crystal display of the present invention.

Hereinafter, the Ag dot process and the bonding process of the cover substrate and the liquid crystal panel according to the aforementioned in-plane switching mode liquid crystal display will be described below.

Figure 4:
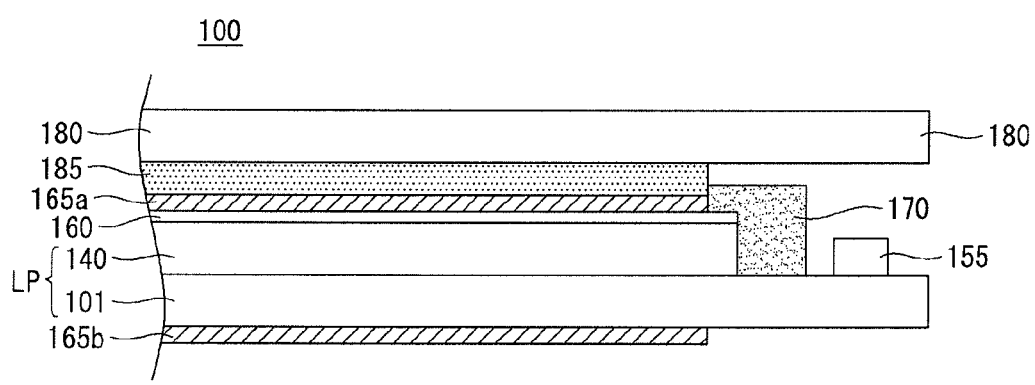
FIG. 4 is a view showing an in-plane switching mode liquid crystal display according to a first exemplary embodiment of the present invention.
Figure 5A:
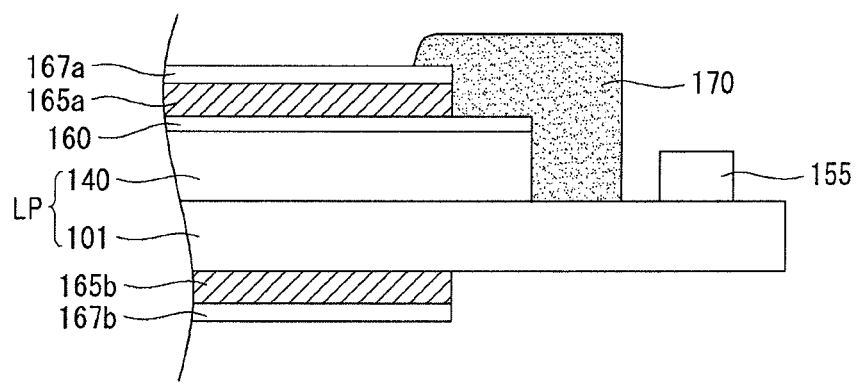
FIGS. 5a to 5c are views showing in steps a method for manufacturing an in-plane switching mode liquid crystal display according to the first exemplary embodiment of the present invention.
Figure 5B:
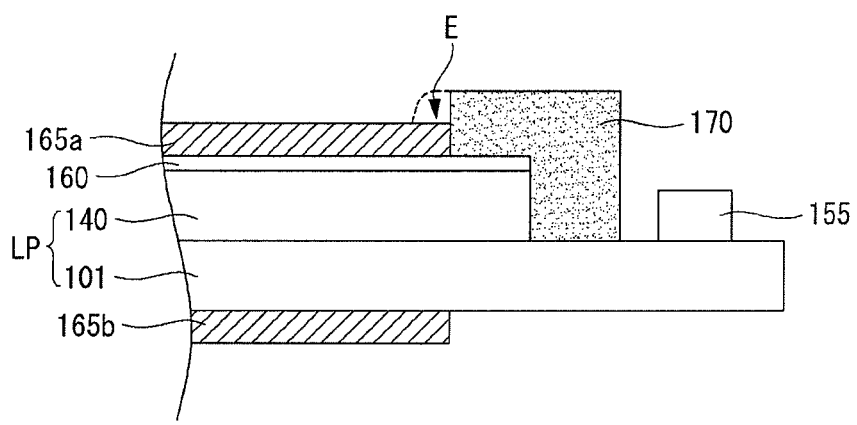
Figure 5C:
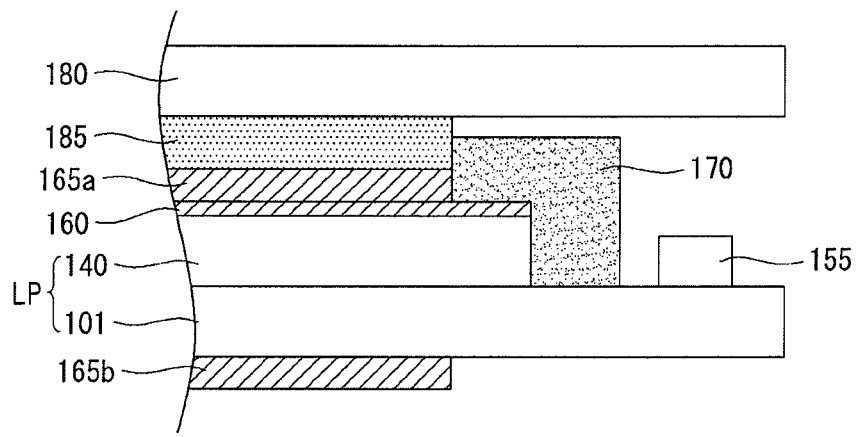

FIG. 4 is a view showing an in-plane switching mode liquid crystal display according to a first exemplary embodiment of the present invention. FIGS. 5a to 5c are views showing in steps a method for manufacturing an in-plane switching mode liquid crystal display according to the first exemplary embodiment of the present invention.

Referring to FIG. 4, in the in-plane switching mode liquid crystal display 100 of the present invention, a liquid crystal panel LP formed by bonding the TFT array substrate 101 and the color filter substrate 140 is disposed, with a liquid crystal layer (not shown) interposed therebetween, the rear ITO 160 and an upper polarizer 165a are disposed on the color filter substrate 140, and a lower polarizer 165b is disposed under the TFT array substrate 101.

An Ag dot 170 connecting the rear ITO 160 of the color filter substrate 140 and the ground of the TFT array substrate 101 is disposed on an edge of the liquid crystal panel LP, i.e., an edge of the TFT array substrate 101 and the color filter substrate 140. The cover substrate 180 is attached and disposed on the liquid crystal panel LP through an OCA film 185.

Referring to FIG. 5a, the method for manufacturing the in-plane switching mode liquid crystal display of FIG. 4 will be described. A thin film transistor, a common electrode, and a pixel electrode are formed on a substrate, thereby preparing a TFT array substrate 101, and a black matrix, color filters, an overcoat layer, and rear ITO are formed on another substrate, thereby preparing a color filter substrate 140.

Next, the TFT array substrate 101 and the color filter substrate 140 are bonded together, and liquid crystal is injected therein to prepare a liquid crystal panel LP. After that, a driving IC 155 is bonded to the edge of the TFT array substrate 101 of the liquid crystal panel PL. Then, an upper polarizer 165a with an upper protective film 167a attached thereon is attached on top of the color filter substrate 140, and a lower polarizer 165b with a lower protective film 167b attached thereon is attached on the bottom of the TFT array substrate 101.

Next, Ag paste for forming an Ag dot is prepared. The Ag paste contains Ag particles, glass frit, and a solvent. The Ag particles serve to provide the conductivity of the Ag dot, and the glass frits serve to provide adhesiveness between the Ag dot and the substrates. The glass frit may be leaded or unleaded glass frit, for example, lead oxide PbO, bismuth oxide Bi2O3, silicon oxide SiO2, boron oxide B2O3, aluminum oxide Al2O3, zinc oxide ZnO, and cerium oxide CeO2.

The solvent serves to liquefy the Ag particles and the glass frit so that they are easily mixed together and applied. The solve may comprise, for example, ethyl carbitol, butyl carbitol, ethyl carbitol acetate, butyl carbitol acetate, texanol, terpine oil, dipropyleneglycol methylether, dipropyleneglycol ethylether, dipropyleneglycol monomethylether, dipropyleneglycol monomethylether acetate, cellosolve acetate, butyl-cellosolve acetate, tripropylene glycol, etc.

The Ag paste prepared from the Ag particles, the glass frit, and the solvent are applied to the liquid crystal panel LP by a method such as dispensing or spraying to thus form the Ag dot 170. More specifically, the Ag paste is applied to the area of the liquid crystal panel LP that exposes the entire edges of the upper polarizer 165a, color filter substrate 140, and TFT array substrate 101 to thus form the Ag dot 170. Accordingly, the Ag dot 170 is in continuous contact with the upper protective film 167a, a side of the upper polarizer 165a, the rear ITO 160, a side of the color filter substrate 140, and the TFT array substrate 101.

Next, referring to FIG. 5b, the upper protective film 167a of the upper polarizer 165a and the lower protective film 167b of the lower polarizer 165b are removed. At this point, part E of the Ag dot 170 covering the top part of the upper protective film 167a is removed simultaneously with the removal of the upper protective film 167a. That is, part of the Ag dot 170 shown in dotted line is removed simultaneously with the removal of the upper protective film 167a.

Accordingly, the Ag dot 170 does not exist on the top surface of the upper polarizer 165a, and is formed to have a structure covering only a side of the upper polarizer 165a. The Ag dot 170 formed in this structure can prevent static electricity by connecting the rear ITO 160 of the color filter substrate 140 and the ground of the TFT array substrate 101.

Next, referring to FIG. 5c, the OCA film 185 is attached onto the cover substrate 180, and then the liquid crystal panel LP and the cover substrate 180 are bonded together by a laminating process, thereby manufacturing the in-plane switching mode liquid crystal display according to the first exemplary embodiment of the present invention.

As described above, the method for manufacturing the in-plane switching mode liquid crystal display according to the first exemplary embodiment of the present invention prevents the Ag dot from being formed in the bonded area of the cover substrate through the process of removing the protective films attached on the polarizers, and adjusts the size of the Ag dot. Accordingly, it has the advantage that the yield of the bonding process of the cover substrate and the liquid crystal panel and the Ag dot process can be improved.

Meanwhile, the in-plane switching mode liquid crystal display according to the first exemplary embodiment of the present invention may further comprise a touch panel.

Figure 6A:
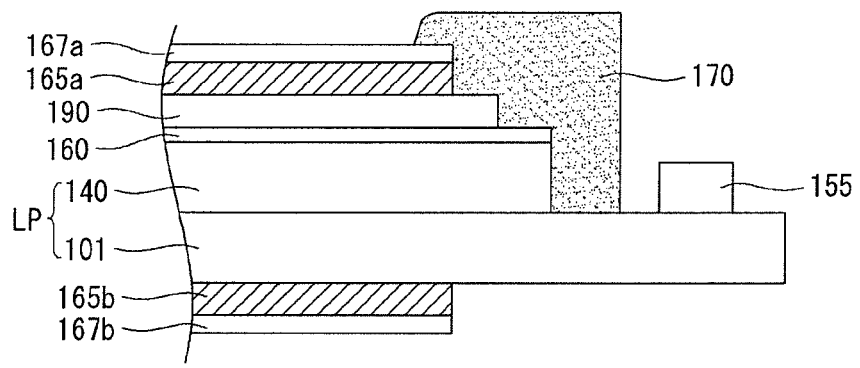
FIGS. 6a to 6c are views showing in steps a method for manufacturing an in-plane switching mode liquid crystal display comprising a touch panel according to the first exemplary embodiment of the present invention.
Figure 6B:
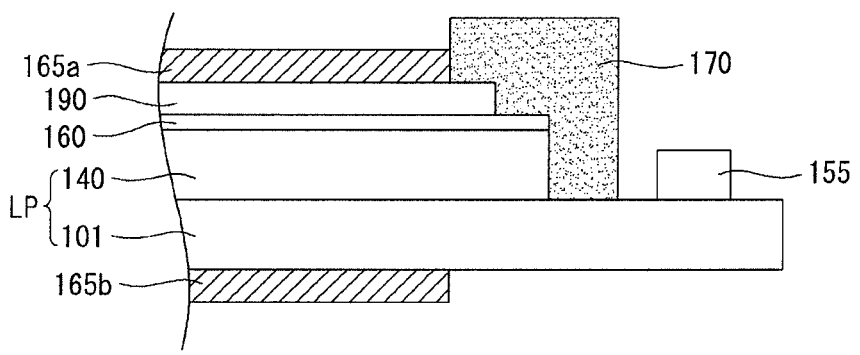
Figure 6C:
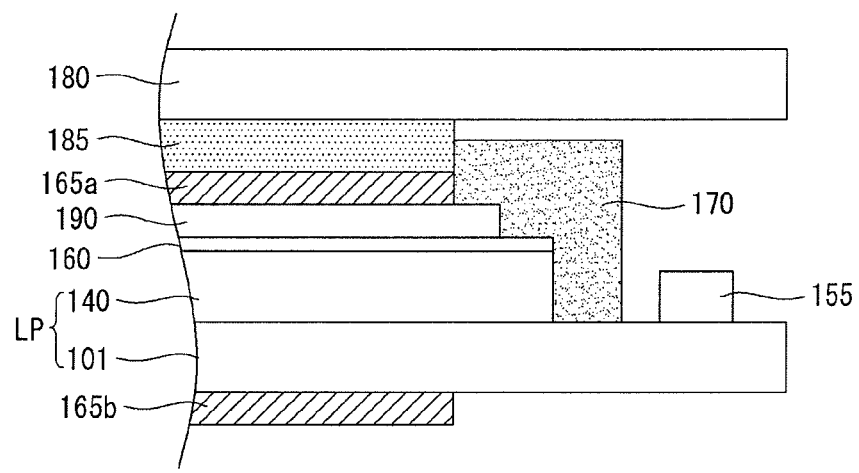

FIGS. 6a to 6c are views showing in steps a method for manufacturing an in-plane switching mode liquid crystal display comprising a touch panel according to the first exemplary embodiment of the present invention. In the following, only the components of the touch panel are added to the description of FIGS. 4 to 5c. Like parts are denoted by like reference numerals, so a description thereof will be omitted.

Referring to FIG. 6a, the TFT array substrate 101 and the color filter substrate 140 with the rear ITO 160 are bonded together, and the driving IC 155 is bonded, thereby manufacturing the liquid crystal panel LP. The touch panel 190 is attached on the liquid crystal panel LP, and an upper polarizer 165a with an upper protective film 167a attached thereon is attached on top of the touch panel 190, and a lower polarizer 167b with a lower protective film 167b attached thereon is attached on the bottom of the TFT array substrate 101.

The Ag paste is applied to the liquid crystal panel LP by a method such as dispensing or spraying to thus form the Ag dot 170. More specifically, the Ag paste is applied to the area of the liquid crystal panel LP that exposes the entire edges of the upper polarizer 165a, touch panel 190, color filter substrate 140, and TFT array substrate 101 to thus form the Ag dot 170. Accordingly, the Ag dot 170 is in continuous contact with the upper protective film 167a, a side of the upper polarizer 165a, the touch panel 190, the rear ITO 160, a side of the color filter substrate 140, and the TFT array substrate 101.

Next, referring to FIG. 6b, the upper protective film 167a of the upper polarizer 165a and the lower protective film 167b of the lower polarizer 165b are removed. At this point, part E of the Ag dot 170 covering the top part of the upper protective film 167a is removed simultaneously with the removal of the upper protective film 167a. That is, part of the Ag dot 170 shown in dotted line is removed simultaneously with the removal of the upper protective film 167a.

Accordingly, the Ag dot 170 does not exist on the top surface of the upper polarizer 165a, and is formed to have a structure covering only a side of the upper polarizer 165a. The Ag dot 170 formed in this structure can prevent static electricity by connecting the rear ITO 160 of the color filter substrate 140 and the ground of the TFT array substrate 101.

Next, referring to FIG. 6c, the OCA film 185 is attached onto the cover substrate 180, and then the liquid crystal panel LP and the cover substrate 180 are bonded together by a laminating process, thereby manufacturing the in-plane switching mode liquid crystal display comprising the touch panel according to the first exemplary embodiment of the present invention.

As described above, the method for manufacturing the in-plane switching mode liquid crystal display comprising the touch panel according to the first exemplary embodiment of the present invention prevents the Ag dot from being formed in the bonded area of the cover substrate through the process of removing the protective films attached on the polarizers, and adjusts the size of the Ag dot. Accordingly, it has the advantage that the yield of the bonding process of the cover substrate and the liquid crystal panel and the Ag dot process can be improved.

Figure 7:
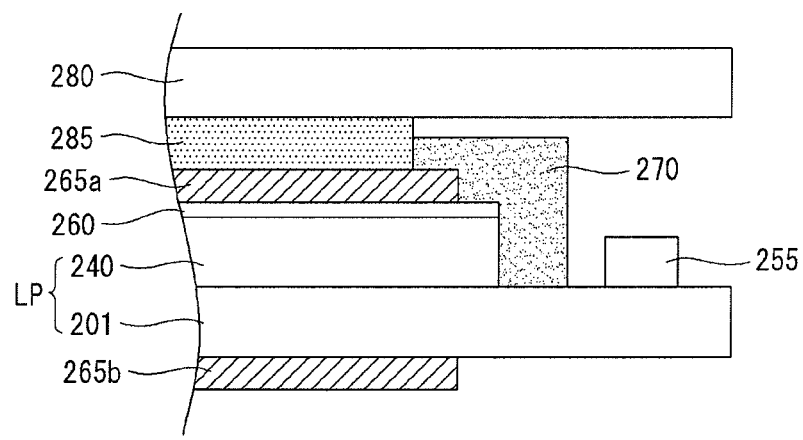
FIG. 7 is a view showing an in-plane switching mode liquid crystal display according to a second exemplary embodiment of the present invention.

FIG. 7 is a view showing an in-plane switching mode liquid crystal display according to a second exemplary embodiment of the present invention, and FIGS. 8a to 8d are view showing in steps a method for manufacturing an in-plane switching mode liquid crystal display according to a second exemplary embodiment of the present invention.

Referring to FIG. 7, in the in-plane switching mode liquid crystal display 200 of the present invention, a liquid crystal panel LP formed by bonding the TFT array substrate 201 and the color filter substrate 240 is disposed, with a liquid crystal layer (not shown) interposed therebetween, the rear ITO 260 and an upper polarizer 265a are disposed on the color filter substrate 240, and a lower polarizer 265b is disposed under the TFT array substrate 201.

An Ag dot 270 connecting the rear ITO 260 of the color filter substrate 240 and the ground of the TFT array substrate 201 is disposed on an edge of the liquid crystal panel LP, i.e., an edge of the TFT array substrate 201 and the color filter substrate 240. The cover substrate 280 is attached and disposed on the liquid crystal panel LP through an OCA film 285.

Meanwhile, in the second exemplary embodiment of the present invention, unlike the first exemplary embodiment of the present invention, the Ag dot 270 is disposed on part of the edge of the upper polarizer 265a.

Figure 8A:
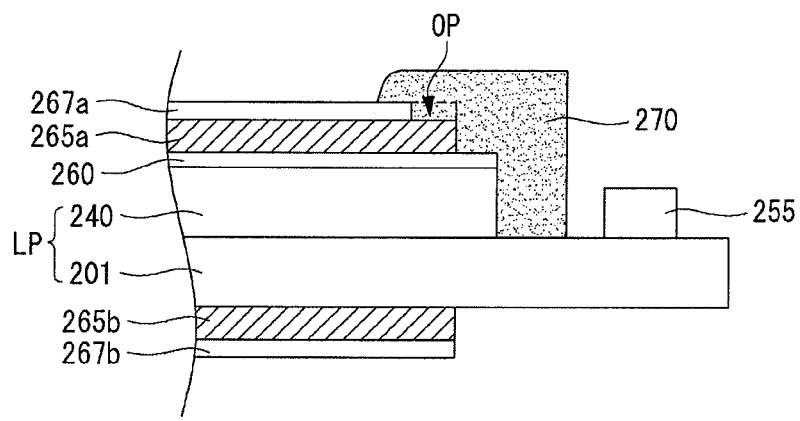
FIGS. 8a to 8d are views showing in steps a method for manufacturing an in-plane switching mode liquid crystal display according to a second exemplary embodiment of the present invention.

Referring to FIG. 8a, the method for manufacturing the in-plane switching mode liquid crystal display of FIG. 7 will be described. A thin film transistor, a common electrode, and a pixel electrode are formed on a substrate, thereby preparing a TFT array substrate 201, and a black matrix, color filters, an overcoat layer, and rear ITO are formed on another substrate, thereby preparing a color filter substrate 240.

Next, the TFT array substrate 201 and the color filter substrate 240 are bonded together, and liquid crystal is injected therein to prepare a liquid crystal panel LP. After that, a driving IC 255 is bonded to the edge of the TFT array substrate 201 of the liquid crystal panel PL. Then, an upper polarizer 265a with an upper protective film 267a attached thereon is attached on top of the color filter substrate 240, and a lower polarizer 265b with a lower protective film 267b attached thereon is attached on the bottom of the TFT array substrate 201.

Figure 8B:
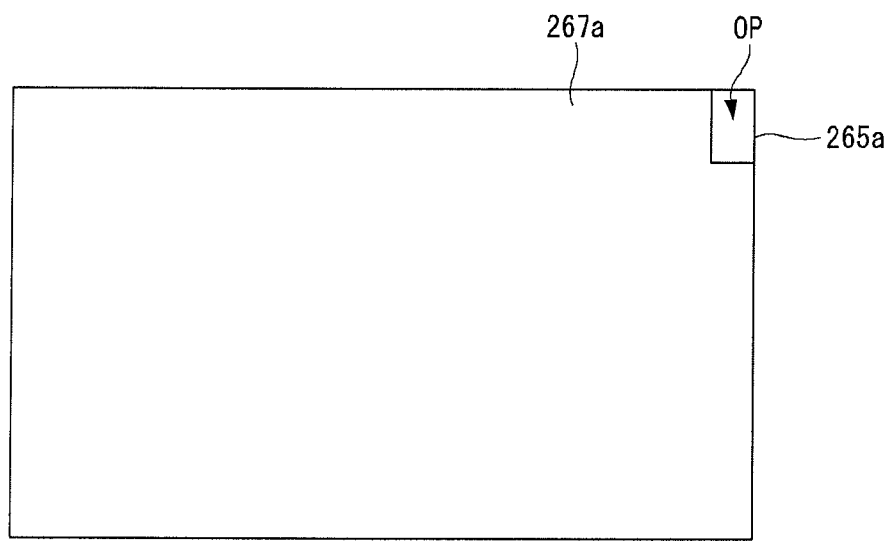

Here, the upper protective film 267a has a cut-out open portion OP. That is, as shown in FIG. 8b, an edge portion of the upper protective film 267a is cut out to provide the open portion OP which exposes the upper polarizer 265a.

Then, the Ag paste prepared from the Ag particles, the glass frit, and the solvent are applied to the liquid crystal panel LP by a method such as dispensing or spraying to thus form the Ag dot 270. More specifically, the Ag paste is applied to the area exposing the entire edges of the upper protective film 267a, upper polarizer 265a, color filter substrate 240, and TFT array substrate 201 to thus form the Ag dot 270. Accordingly, the Ag dot 270 is in continuous contact with the upper protective film 267a, the upper polarizer 265a, the rear ITO 260, a side of the color filter substrate 240, and the TFT array substrate 201.

Figure 8C:
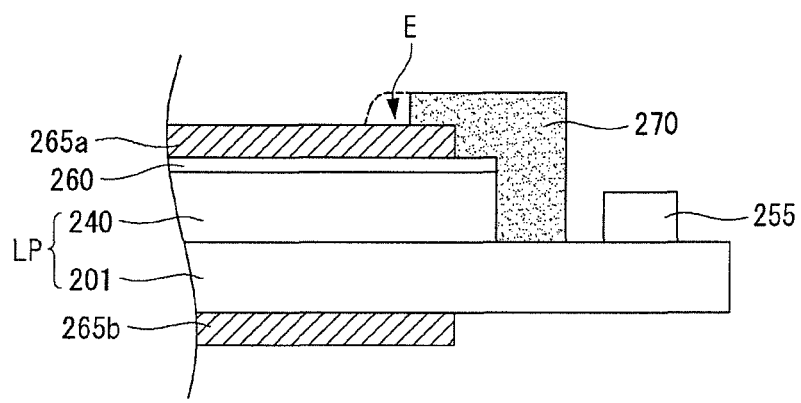

Next, referring to FIG. 8c, the upper protective film 267a of the upper polarizer 265a and the lower protective film 267b of the lower polarizer 265b are removed. At this point, part E of the Ag dot 270 covering the top part of the upper protective film 267a is removed simultaneously with the removal of the upper protective film 267a. That is, part of the Ag dot 270 shown in dotted line is removed simultaneously with the removal of the upper protective film 267a.

Accordingly, the Ag dot 270 is formed to have a structure covering the top surface and side of the upper polarizer 165a. The Ag dot 270 formed in this structure can prevent static electricity by connecting the rear ITO 260 of the color filter substrate 240 and the ground of the TFT array substrate 201.

Figure 8D:
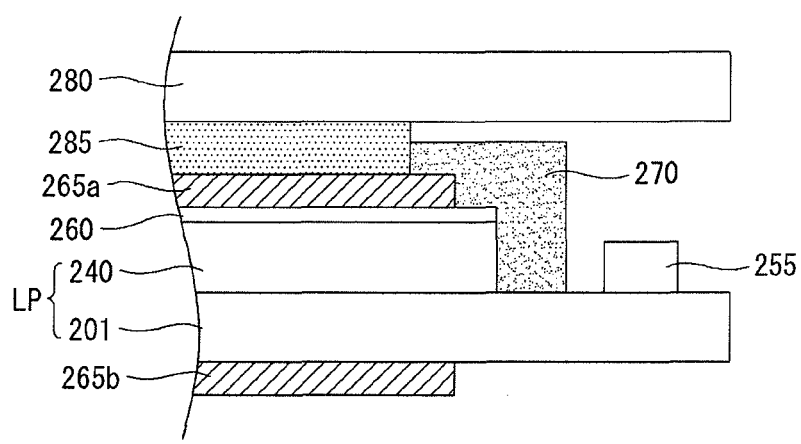

Next, referring to FIG. 8d, the OCA film 285 is attached onto the cover substrate 280, and then the liquid crystal panel LP and the cover substrate 280 are bonded together by a laminating process, thereby manufacturing the in-plane switching mode liquid crystal display according to the second exemplary embodiment of the present invention.

As described above, the method for manufacturing the in-plane switching mode liquid crystal display according to the second exemplary embodiment of the present invention prevents the Ag dot from being formed in the bonded area of the cover substrate through the process of removing the protective films attached on the polarizers, and adjusts the size of the Ag dot. Accordingly, it has the advantage that the yield of the bonding process of the cover substrate and the liquid crystal panel and the Ag dot process can be improved.

Meanwhile, the in-plane switching mode liquid crystal display according to the second exemplary embodiment of the present invention may further comprise a touch panel.

Figure 9A:
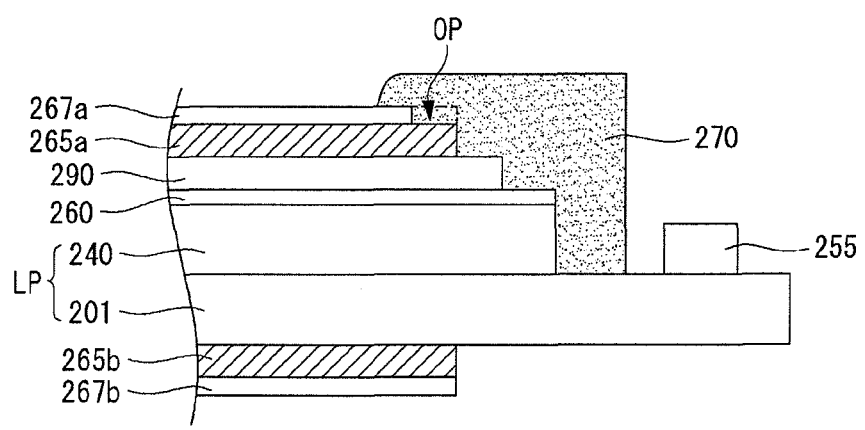
FIGS. 9a to 9c are views showing in steps a method for manufacturing an in-plane switching mode liquid crystal display comprising a touch panel according to the second exemplary embodiment of the present invention.
Figure 9B:
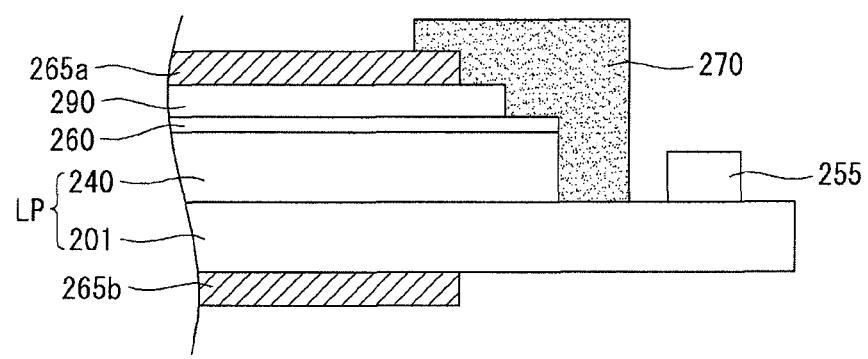
Figure 9C:
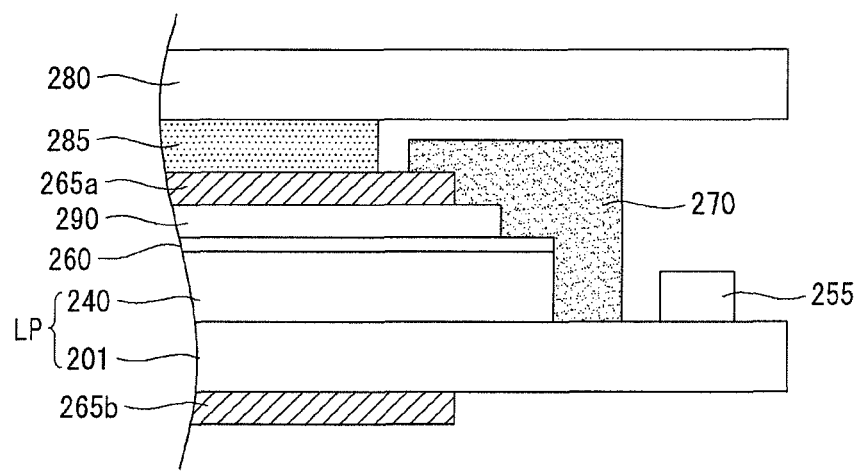

FIGS. 9a to 9c are views showing in steps a method for manufacturing an in-plane switching mode liquid crystal display comprising a touch panel according to the second exemplary embodiment of the present invention. In the following, only the components of the touch panel are added to the description of FIGS. 7 to 8d. Like parts are denoted by like reference numerals, so a description thereof will be omitted.

Referring to FIG. 9a, the TFT array substrate 201 and the color filter substrate 240 with the rear ITO 260 are bonded together, and the driving IC 255 is bonded, thereby manufacturing the liquid crystal panel LP. The touch panel 290 is attached on the liquid crystal panel LP, and an upper polarizer 265a with an upper protective film 267a attached thereon is attached on top of the touch panel 290, and a lower polarizer 267b with a lower protective film 267b attached thereon is attached on the bottom of the TFT array substrate 201. An open portion OP is formed on the upper protective film 267a.

Then, the Ag paste is applied to the liquid crystal panel LP by a method such as dispensing or spraying to thus form the Ag dot 270. More specifically, the Ag paste is applied to the area of the liquid crystal panel LP that exposes the entire edges of the upper protective film 267a, upper polarizer 265a, touch panel 290, color filter substrate 240, and TFT array substrate 201 to thus form the Ag dot 270. Accordingly, the Ag dot 270 is in continuous contact with the upper protective film 267a, a top surface and side of the upper polarizer 265a, the touch panel 290, the rear ITO 260, a side of the color filter substrate 240, and the TFT array substrate 201.

Next, referring to FIG. 9b, the upper protective film 267a of the upper polarizer 265a and the lower protective film 267b of the lower polarizer 265b are removed. At this point, part E of the Ag dot 270 covering the top part of the upper protective film 267a is removed simultaneously with the removal of the upper protective film 267a. That is, part of the Ag dot 270 shown in dotted line is removed simultaneously with the removal of the upper protective film 267a. And, part of the Ag dot 270 positioned in the open portion OP of the upper protective film 267a is left on the upper polarizer 265a as it is.

Accordingly, the Ag dot 270 is formed to have a structure covering the top surface and side of the upper polarizer 265a. The Ag dot 270 formed in this structure can prevent static electricity by connecting the rear ITO 260 of the color filter substrate 240 and the ground of the TFT array substrate 201.

Next, referring to FIG. 9c, the OCA film 285 is attached onto the cover substrate 280, and then the liquid crystal panel LP and the cover substrate 280 are bonded together by a laminating process, thereby manufacturing the in-plane switching mode liquid crystal display comprising the touch panel.

As described above, the method for manufacturing the in-plane switching mode liquid crystal display comprising the touch panel according to the second exemplary embodiment of the present invention prevents the Ag dot from being formed in the bonded area of the cover substrate through the process of removing the protective films attached on the polarizers, and adjusts the size of the Ag dot. Accordingly, it has the advantage that the yield of the bonding process of the cover substrate and the liquid crystal panel and the Ag dot process can be improved.

Figure 10:
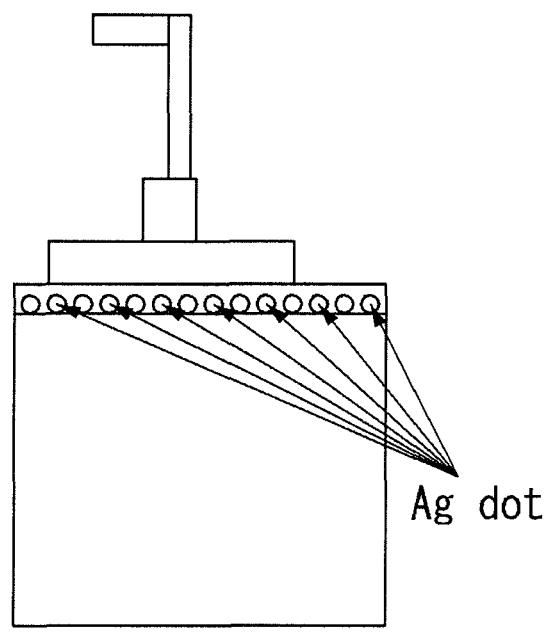
FIG. 10 is a view showing the in-plane switching mode liquid crystal display manufactured according to the first exemplary embodiment of the present invention.
Figure 11A:
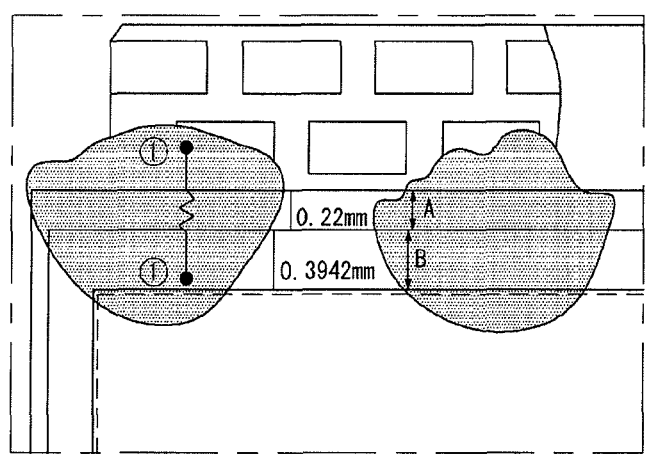
FIG. 11a is a view showing a liquid crystal display having an Ag dot applied thereto.
Figure 11B:
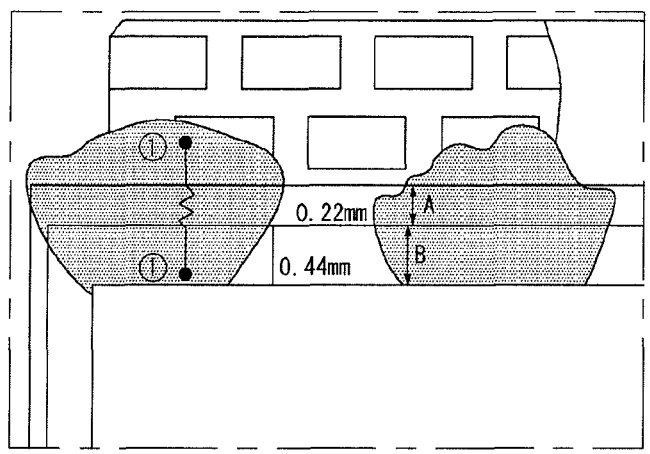
FIG. 11b is a view showing a liquid crystal display having a protective film removed therefrom.
Figure 11C:
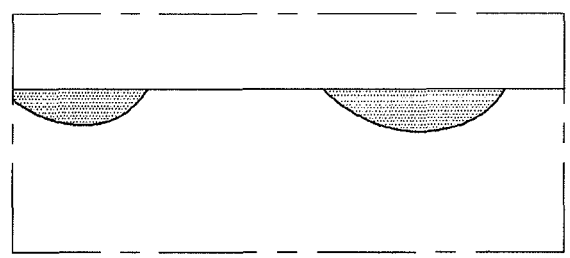
FIG. 11c is a view showing the removed protective film.

FIG. 10 is a view showing the in-plane switching mode liquid crystal display manufactured according to the first exemplary embodiment of the present invention, FIG. 11a is a view showing a liquid crystal display having an Ag dot applied thereto, FIG. 11b is a view showing a liquid crystal display having a protective film removed therefrom, and FIG. 11c is a view showing the removed protective film.

Referring to FIG. 10, a plurality of Ag dots are applied to the edge of the liquid crystal panel manufactured according to the first exemplary embodiment of the present invention.

In more detail, it can be seen from FIG. 11a that the Ag dots are continuously applied between the TFT array substrate and the protective film, and it can be seen from FIG. 11b that, after the protective film is removed, part of the Ag dot on the protective film is removed and thus is not left on the polarizer. And, it can be seen from FIG. 11c that part of the Ag dot is left on the removed protective film. That is, it can be seen that part of the Ag dot is removed simultaneously with the removal of the protective film.

Moreover, a resistance between the TFT array substrate ① and the color filter substrate ② is found to be about 0.9Ω in FIG. 11a which illustrates a state where the protective film is not removed, while a resistance between the TFT array substrate ① and the color filter substrate ② is found to be about 0.8Ω in FIG. 11b which illustrates a state where the protective film is removed. So, there is little difference in resistance.

As described above, the method for manufacturing the in-plane switching mode liquid crystal display according to the present invention can prevent the Ag dot from being formed in the bonded area of the cover substrate through the process of removing the protective films attached on the polarizers, and adjust the size of the Ag dot. Accordingly, it has the advantage that the yield of the bonding process of the cover substrate and the liquid crystal panel and the Ag dot process can be improved.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures. Moreover, unless the term "means" is explicitly recited in a limitation of the claims, such limitation is not intended to be interpreted under 35 USC 112(6).

What is claimed is:

1. A method for manufacturing an in-plane switching mode liquid crystal display, comprising:
   forming a liquid crystal panel by interposing a liquid crystal layer between a color filter substrate and a thin film transistor (TFT) array substrate;
   attaching a polarizer, with a protective film attached thereon, on the color filter substrate;
   forming an Ag dot to be in contact with an edge of the protective film, the color filter substrate, and the TFT array substrate;
   removing part of the Ag dot by removing the protective film; and
   attaching a cover substrate on the color filter substrate.

2. The method of claim 1, wherein the Ag dot is in continuous contact with the polarizer, the color filter substrate, and the TFT array substrate.

3. The method of claim 2, further comprising:
   disposing a rear Indium Tin Oxide (ITO) between the polarizer and the color filter substrate,
   wherein the Ag dot is in contact with the rear ITO.

4. The method of claim 1, wherein the Ag dot is made of an Ag paste.

5. The method of claim 1, further comprising:
   attaching a touch panel on the liquid crystal panel before attaching the polarizer, with the protective film attached thereon, on the color filter substrate.

6. A method for manufacturing an in-plane switching mode liquid crystal display, comprising:
   forming a liquid crystal panel by interposing a liquid crystal layer between a color filter substrate and a thin film transistor (TFT) array substrate;
   attaching a polarizer, with a protective film attached thereon, on the color filter substrate, the protective film having an open portion;
   forming an Ag dot to be in contact with an edge of the protective film, the polarizer, the color filter substrate, and the TFT array substrate;
   removing part of the Ag dot by removing the protective film; and
   attaching a cover substrate on the color filter substrate.

7. The method of claim 6, wherein the open portion of the protective film is a cut-out region of an edge of the protective film.

8. The method of claim 6, wherein the Ag dot is in continuous contact with the polarizer, the color filter substrate, and the TFT array substrate.

9. The method of claim 8, wherein the Ag dot is in contact with a top surface of the polarizer.

10. The method of claim 6, further comprising:
    attaching a touch panel on the liquid crystal panel before attaching the polarizer, with the protective film attached thereon, on the color filter substrate, the protective film having an open portion.

* * * * *